United States Patent Office 3,509,101
Patented Apr. 28, 1970

3,509,101
PROCESS OF PREPARING LINEAR POLYES-
TERS USING TANTALUM ALKALI METAL
HEXAFLUORIDE POLYCONDENSATION
CATALYSTS
Mary J. Stewart, Media, and John A. Price, Swarthmore, Pa., assignors to FMC Corporation, Philadelphia, Pa., a corporation of Delaware
No Drawing. Filed May 20, 1968, Ser. No. 730,621
Int. Cl. C08g 17/015
U.S. Cl. 260—75    5 Claims

ABSTRACT OF THE DISCLOSURE

Process of preparing linear polyesters comprising carrying out an esterification reaction between a polyhydric alcohol and a dicarboxylic acid and then polycondensing the reaction product thereof in the presence of a tantalum alkali metal hexafluoride.

---

This invention relates to an improved method for the preparation of linear polyesters. More particularly, it relates to an improved polycondensation catalyst for use in the manufacture of highly polymeric linear polyesters.

The fiber- and film-forming linear polyesters of the present invention, which are known as saturated linear polyesters, can be prepared by first reacting an aromatic dicarboxylic acid, which does not contain any ethylenic unsaturation, with a polyhydric alcohol to form a polyester prepolymer. The resulting polyester prepolymer is then polycondensed in the presence of a polycondensation catalyst to form a linear polyester resin.

The polyester prepolymer formed by the direct esterification reaction between ethylene glycol and terephthalic acid is comprised of bis-2-hydroxyethyl terephthalate, along with substantial quantities of higher condensates, wherein the D.P. (degree of polymerization) varies from about 2 to 6. However, for purposes of simplicity in describing the present invention, hereinafter the terms "polyester prepolymer" and "bis-2-hydroxyethyl terephthalate" will both denote and include within their scope the reaction product of the direct esterification reaction between terephthalic acid and ethylene glycol.

Heretofore, various materials have been suggested as polycondensation catalysts for polycondensing polyester prepolymer products. However, in general, none of the substances that have been suggested as polycondensation catalysts heretofore have been completely satisfactory. For example, many of the polycondensation catalysts of the prior art only catalyze the condensation reaction to a low degree and they do not promote the reaction rate sufficiently to be acceptable for commercial purposes. Therefore, such polycondensation catalysts of the prior art do not act to form polyester products having carboxyl contents as low as required for some resin uses, or molecular weights and melting points as high as desired.

From a commercial standpoint, it is essential that a polyester resin be produced in the shortest possible time and the desired degree of polymerization be obtained. A polyethylene terephthalate resin suitable for melt spinning should have a carboxyl content value of about or below 50 equivalents per million grams (eq./$10^6$ gr. or meq./kg.), a melting point of preferably at least about 258–260° C., and an intrinsic viscosity preferably not less than about 0.60 (determined in a 60% phenol-40% tetrachloroethane solution, wt./wt., at 30° C.), in order for the filaments formed therefrom to possess a satisfactory level of hydrolytic stability, thermal stability, ultra-violet light stability and a high degree of tenacity which is necessary for use of such filaments in the manufacture of fibers such as are used in wash and wear clothing.

It is an object of the present invention to prepare highly polymeric linear polyesters by carrying out a direct esterification reaction between a suitable dicarboxylic acid and a polyhydric alcohol to form a polyester prepolymer, and then to polycondense the said polyester prepolymer in the presence of an improved polycondensation catalyst.

It is another object of the present invention to prepare a highly polymeric linear polyester resin by polycondensing bis-2-hydroxyethyl terephthalate in the presence of an improved polycondensation catalyst.

These and other objects are accomplished in accordance with the present invention, which involves a method for preparing highly polymeric linear polyethylene terephthalate wherein terephthalic acid is reacted with ethylene glycol in the presence of a first stage catalytic additive to form a polyester prepolymer, and where the resulting polyester prepolymer is polycondensed in the presence of a polycondensation catalyst, the improvement comprising carrying out the polycondensation of the polyester prepolymer in the presence of a catalytic amount of a tantalum alkali metal hexafluoride.

The tantalum alkali metal hexafluorides that can be used as polycondensation catalysts in the present method include, for example, tantalum potassium hexafluoride ($TaKF_6$), tantalum sodium hexafluoride ($TaNaF_6$), and tantalum lithium hexafluoride ($TaLiF_6$).

The preparation of polyester resins via the direct esterification reaction is generally carried out with a molar ratio of glycol, such as ethylene glycol, to a dicarboxylic acid, such as terephthalic acid, of from about 1:1 to about 15:1, but preferably from about 1.2:1 to about 2.6:1. The direct esterification step is generally carried out at temperatures ranging from about 180° C. to about 280° C. in the absence of an oxygen containing atmosphere at atmospheric or elevated pressure for about two to four hours to form the desired polyester prepolymer. For example, the reaction may be carried out in an atmosphere of nitrogen.

Any known suitable first stage direct esterification catalytic additive may be used in the direct esterification step of the present method. For example, calcium acetate or triethylamine may be used. The first stage catalytic additives are generally used in concentrations ranging from $5 \times 10^{-5}$ mole to about $5 \times 10^{-1}$ mole of catalytic additive per mole of terephthalic acid present in the initial terephthalic acid-glycol reaction mixture.

The polycondensation step of the present invention is accomplished by adding a tantalum alkali metal hexafluoride to a polyester prepolymer or bis-2-hydroxyethyl terephthalate and heating the blend thereof under reduced pressure within the range of from about 0.05 mm. to 20 mm. of mercury while being agitated at a temperature of from about 260° C. to about 325° C. for from two to four hours. In accordance with the present invention, a tantalum alkali metal hexafluoride is generally employed in amounts ranging from about 0.01% to about 0.2%, based on the weight of the polyester prepolymer to be polycondensed. Usually, it has been found that from about 0.02% to about 0.1% of a subject polycondensation catalyst is preferred in most instances. Higher or lower concentrations of a tantalum alkali metal hexafluoride can also be used in the subject polycondensation reaction. However, when concentrations less than the above are used, its effectiveness is generally reduced, whereas if concentrations greater than this are used, no further improvement in the present method or desired product is generally obtained.

The following example of a preferred embodiment will further serve to illustrate the present invention. All parts are by weight, unless otherwise indicated.

EXAMPLE

A blended mixture comprising 474 g. of terephthalic acid, 288 mls. of ethylene glycol and 149 mls. of triethylamine was charged into a reaction vessel equipped with a nitrogen inlet, a Dean-Starke separating apparatus, heating means, and stirring means. The reaction mixture was agitated and the temperature was raised to about 197° C. under a nitrogen blanket at atmospheric pressure. At about 190° C., a water-triethylamine azeotropic mixture started to distill off. The azeotropic mixture was continuously separated by means of the Dean-Starke apparatus, and the triethylamine recovered was continuously returned to the reaction vessel. The reaction mixture became almost clear. Then, the temperature was allowed to rise to about 230° C. over a one hour period to form a polyester prepolymer. The prepolymer product was allowed to cool under an atmosphere of nitrogen.

Fifty grams of the above prepared prepolymer were mixed with 0.02 g. of tantalum potassium hexafluoride and placed in a reaction vessel. The mixture was heated at about 280° C. under a residual nitrogen reduced atmosphere of from about 0.05 to about 0.1 mm. of mercury while under agitation for about 2 hours to bring about the polycondensation of the polyester prepolymer and formation of a polyester resin. The resulting formed polyester had an intrinsic viscosity of 0.68, a carboxyl content value of 20 (meq./kg.) and a melting point of about 261° C.

The intrinsic viscosity of the polyester resin product of the above example was measured in a 60% phenol—40% tetrachloroethane solution, wt./wt., at 30° C. The other analytical values in the above example were obtained through the use of conventional laboratory quantitative procedures.

The process of the present invention has been described with particular reference to polyethylene terephthalate, but it will be obvious that the subject invention includes within its scope other polymeric polymethylene terphthalates formed from glycols of the series $HO(CH_2)_nOH$, where $n$ is 2 to 10 and terephthalic acid or esters thereof and copolyesters containing varied amounts of other suitable dicarboxylic acids or esters thereof, such as isophthalic acid.

The polyester resin produced in the above example was characterized by its high molecular weight, as indicated by its intrinsic viscosity, high melting point, and low carboxyl content value, thereby making such resins particularly suitable for melt spinning into filaments and films.

It will be apparent that various different embodiments can be made practicing this invention, without departing from the spirit and scope thereof, and therefore, it is not intended to be limited, except as indicated in the appended claims.

We claim:

1. A process of preparing polyethylene terephthalate resin wherein terephthalic acid is reacted with ethylene glycol in the presence of a first stage catalytic additive to form a polyester prepolymer and wherein the resulting polyester prepolymer is polycondensed in the presence of a polycondensation catalyst, the improvement comprising carrying out the polycondensation of the polyester prepolymer in the presence of a catalytic amount of a tantalum alkali metal hexafluoride as a polycondensation catalyst.

2. The process of claim 1 wherein the tantalum alkali metal hexafluoride catalyst is present in an amount of from about 0.01% to about 0.2%, based on the weight of the polyester prepolymer.

3. The process of claim 1 wherein the alkali metal is potassium.

4. The process of claim 1 wherein the alkali metal is sodium.

5. The process of claim 1 wherein the alkali metal is lithium.

References Cited

UNITED STATES PATENTS 3,281,497   10/1966   Joo et al. _____ 260—75 XR

WILLIAM H. SHORT, Primary Examiner

L. P. QUAST, Assistant Examiner